(12) United States Patent
Pickle

(10) Patent No.: US 8,151,377 B2
(45) Date of Patent: Apr. 10, 2012

(54) ODORLESS AND OVERFLOW-LESS TOILET SYSTEM

(76) Inventor: Ronald Ferrell Pickle, Waco, GA (US)

( * ) Notice: Subject to any disclaimer, the term of this patent is extended or adjusted under 35 U.S.C. 154(b) by 801 days.

(21) Appl. No.: 12/189,142

(22) Filed: Aug. 9, 2008

(65) Prior Publication Data

US 2009/0038065 A1    Feb. 12, 2009

Related U.S. Application Data

(60) Provisional application No. 60/955,381, filed on Aug. 12, 2007.

(51) Int. Cl.
*E03D 9/04* (2006.01)
(52) U.S. Cl. ............... 4/213; 4/211; 4/216; 4/351; 4/427
(58) Field of Classification Search ............... 4/213, 211, 4/216, 218, 348, 349, 350, 351, 427
See application file for complete search history.

(56) References Cited

U.S. PATENT DOCUMENTS

| | | | | |
|---|---|---|---|---|
| 1,430,417 A | * | 9/1922 | Tucker | 4/427 |
| 3,262,132 A | * | 7/1966 | Mann | 4/427 |
| 3,703,010 A | * | 11/1972 | Russell | 4/216 |
| 3,728,746 A | * | 4/1973 | Konen et al. | 4/696 |
| 3,805,304 A | * | 4/1974 | Ikehata | 4/352 |
| 3,938,201 A | * | 2/1976 | McGrew | 4/213 |
| 3,942,200 A | * | 3/1976 | Pearson | 4/213 |
| 4,165,544 A | * | 8/1979 | Barry | 4/213 |
| 4,242,765 A | * | 1/1981 | Russell | 4/321 |
| 4,338,688 A | * | 7/1982 | Petty | 4/696 |
| 4,375,704 A | * | 3/1983 | Smith | 4/213 |
| 4,403,355 A | * | 9/1983 | Petty | 4/679 |
| 4,800,596 A | * | 1/1989 | Menge | 4/348 |
| 4,864,664 A | * | 9/1989 | Higgins | 4/213 |
| 4,984,305 A | * | 1/1991 | Boisvert | 4/213 |
| 5,050,632 A | * | 9/1991 | Means, Jr. | 137/360 |
| 5,079,782 A | * | 1/1992 | Sim | 4/216 |
| 5,083,322 A | * | 1/1992 | Goodman | 4/213 |
| 5,193,227 A | * | 3/1993 | Crowley, Jr. | 4/213 |
| 5,333,321 A | * | 8/1994 | Redford | 4/348 |
| 5,361,422 A | * | 11/1994 | Vincent et al. | 4/213 |
| 5,369,811 A | * | 12/1994 | Serre | 4/213 |
| 5,386,594 A | * | 2/1995 | Hilton | 4/213 |
| 5,539,938 A | * | 7/1996 | Tubbs | 4/325 |
| 5,570,477 A | * | 11/1996 | Rodriguez | 4/213 |
| 5,575,019 A | * | 11/1996 | Kijewski | 4/209 R |
| 5,715,543 A | * | 2/1998 | Sim | 4/213 |
| 5,727,263 A | * | 3/1998 | Hugo Ceja Estrada | 4/216 |

(Continued)

*Primary Examiner* — Brian Glessner
*Assistant Examiner* — Joshua Ihezie
(74) *Attorney, Agent, or Firm* — Bradley D. Crose; Crose Law LLC

(57) ABSTRACT

The technology described herein provides an odorless and overflow-less toilet system. The technology provides for the removal of odor at its source and aids in overflow protection. The technology provides a toilet system having a second chamber running in fluid communication with a first chamber and a second exit port to allow for the continuation of the second chamber flow to a trap assembly. The trap assembly is configured to separate exhaust odors and overflows. The trap assembly prevents sewage gasses from escaping back through the toilet. The trap assembly allows overflows to be routed back to a sewage out line. The trap assembly provides for the flow of odors from the toilet with an inline exhaust fan. The inline exhaust fan pulls odors from the toilet through the second chamber and exit port of the toilet through the trap assembly and then through the inline exhaust fan to exit.

17 Claims, 8 Drawing Sheets

U.S. PATENT DOCUMENTS

| | | | | |
|---|---|---|---|---|
| 5,809,581 | A * | 9/1998 | Brown | 4/213 |
| 5,819,324 | A * | 10/1998 | Bianco | 4/213 |
| 5,906,009 | A * | 5/1999 | Sakar | 4/216 |
| 5,930,844 | A * | 8/1999 | Scott, III | 4/213 |
| 6,055,677 | A * | 5/2000 | McKinley | 4/217 |
| 6,073,273 | A * | 6/2000 | Tillen | 4/214 |
| 6,173,453 | B1 * | 1/2001 | Shahar | 4/213 |
| 6,260,214 | B1 * | 7/2001 | Smith | 4/213 |
| 6,295,656 | B1 * | 10/2001 | Tillen | 4/216 |
| 6,314,591 | B1 * | 11/2001 | Schildt | 4/420 |
| 6,370,703 | B1 * | 4/2002 | Kim et al. | 4/216 |
| 6,499,150 | B1 * | 12/2002 | Thompson | 4/213 |
| 6,944,888 | B1 * | 9/2005 | Canales, Jr. | 4/213 |
| 6,983,491 | B2 * | 1/2006 | Curtis et al. | 4/216 |
| 7,165,274 | B1 * | 1/2007 | Vilhauer | 4/213 |
| 7,302,714 | B2 | 12/2007 | Orcutt | |
| 7,383,594 | B1 * | 6/2008 | Giesken et al. | 4/427 |
| 7,461,410 | B1 * | 12/2008 | Shaffer | 4/213 |
| 7,644,450 | B2 * | 1/2010 | Lapossy | 4/213 |
| 7,730,560 | B2 * | 6/2010 | Markaj | 4/213 |
| 7,757,312 | B2 * | 7/2010 | Stack et al. | 4/427 |
| 2003/0192112 | A1 * | 10/2003 | Ware | 4/213 |
| 2003/0229937 | A1 * | 12/2003 | Curtis et al. | 4/216 |
| 2006/0031979 | A1 * | 2/2006 | Johnson | 4/213 |
| 2006/0213001 | A1 * | 9/2006 | Mattiello | 4/213 |
| 2006/0288469 | A1 * | 12/2006 | Gan | 4/213 |
| 2008/0083056 | A1 * | 4/2008 | Damianoe et al. | 4/213 |
| 2008/0216220 | A1 * | 9/2008 | Markaj | 4/213 |
| 2008/0295234 | A1 * | 12/2008 | White | 4/214 |
| 2010/0199413 | A1 * | 8/2010 | Pollack et al. | 4/213 |

* cited by examiner

ODORLESS AND OVERFLOW-LESS TOILET SYSTEM

FIELD OF INVENTION

The field of invention is an odorless and overflow-less toilet or urinal system. More particularly, a system to remove odor at its source and aid in overflow protection.

BACKGROUND OF INVENTION

It has been highly desirable to create a toilet or urinal system that offers both odor and overflow protection. While many inventions have been found that address odor removal, and other inventions that address overflow protection, no known prior art has been found that addresses both odor removal and overflow protection. Prior art odor removal and prior art overflow protection devices are either expensive, very difficult to repair or maintain, or both.

Earlier U.S. Pat. No. 5,809,581, while this system fulfills its objective of odor removal, it would cease to function in the event of an overflow condition. The conduit from the toilet to the fan would become blocked by fluids that could not escape.

U.S. Pat. No. 7,302,714 shows ports and floats integrated in the toilet bowl that could be blocked by solids in the event of an overflow thus creating a maintenance issue and allow sewage gasses to escape back through the toilet and into the atmosphere.

And U.S. Pat. No. 7,383,594 has a second drain port with screen that could also become blocked with solids and thus creating overflowing conditions and maintenance issues in the event of an overflow.

SUMMARY OF THE INVENTION

The invention provides a system for means of odor removal and overflow protection at the source, the toilet bowl or urinal. The system is comprised of three main components connected together with PVC or cast iron conduits.

One item is the toilet bowl or urinal with a second chamber running in fluid communication with the originally designed first chamber and a second exit port to allow for the continuation of the second chamber flow to the unique trap assembly to allow of exhausted odors and overflows.

Another item is the unique trap assembly (U.T.A.) which allows for the separation of exhausted odors and overflows. The U.T.A. is a specially designed trap assembly that is engineered to allow the system to function properly for each type of toilet or urinal, whether floor or wall mounted. The U.T.A. prevents sewage gasses from escaping back through the toilet. The U.T.A. allows overflows to be routed back to the sewage out line. The U.T.A. allows for the flow of odors from the toilet or urinal by the use of an inline exhaust fan. The U.T.A. is maintained by a trap primer made into the toilet or urinal to be described in more detail later.

The third component is the use of an inline exhaust fan. The inline exhaust fan pulls odors from the toilet or urinal through the second chamber and exit port of toilet or urinal, through the U.T.A., then through the inline exhaust fan where odors are exhausted to the outside atmosphere.

The three components are connected with PVC or cast iron pipe.

DETAILED DESCRIPTION OF THE PREFERRED EMBODIMENT

Figure 1:
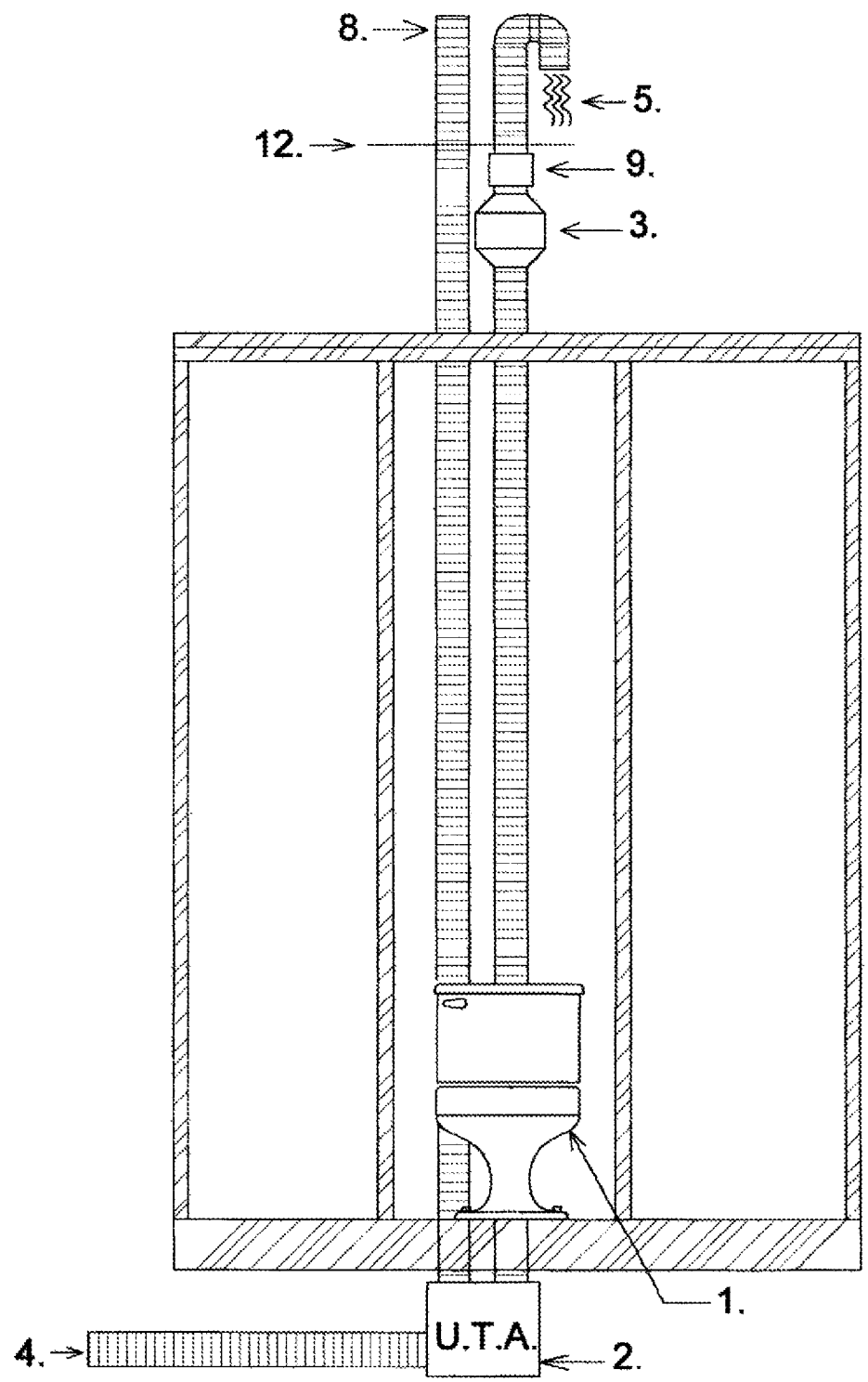
FIG. 1 is a front rough in view of the components of the odorless and overflows-less toilet system. The dual chamber and dual exit port toilet 1 floor mounted type, the unique trap assembly 2 U.T.A. and the inline exhaust fan 3.
Figure 2:
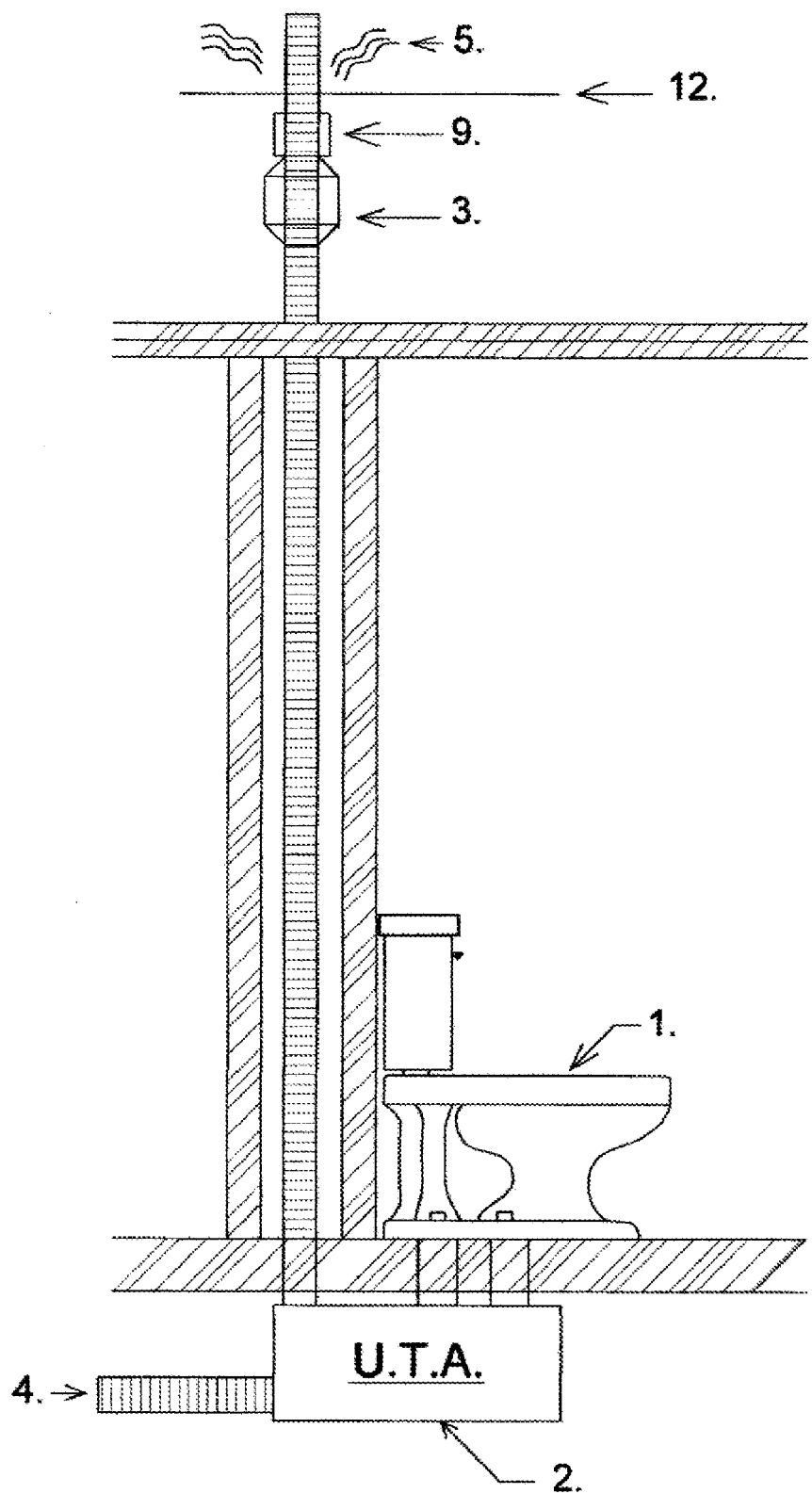
FIG. 2 is a side rough in view of the components of the odorless and overflow-less toilet system. Toilet 1, U.T.A. 2, and fan 3.
Figure 3:
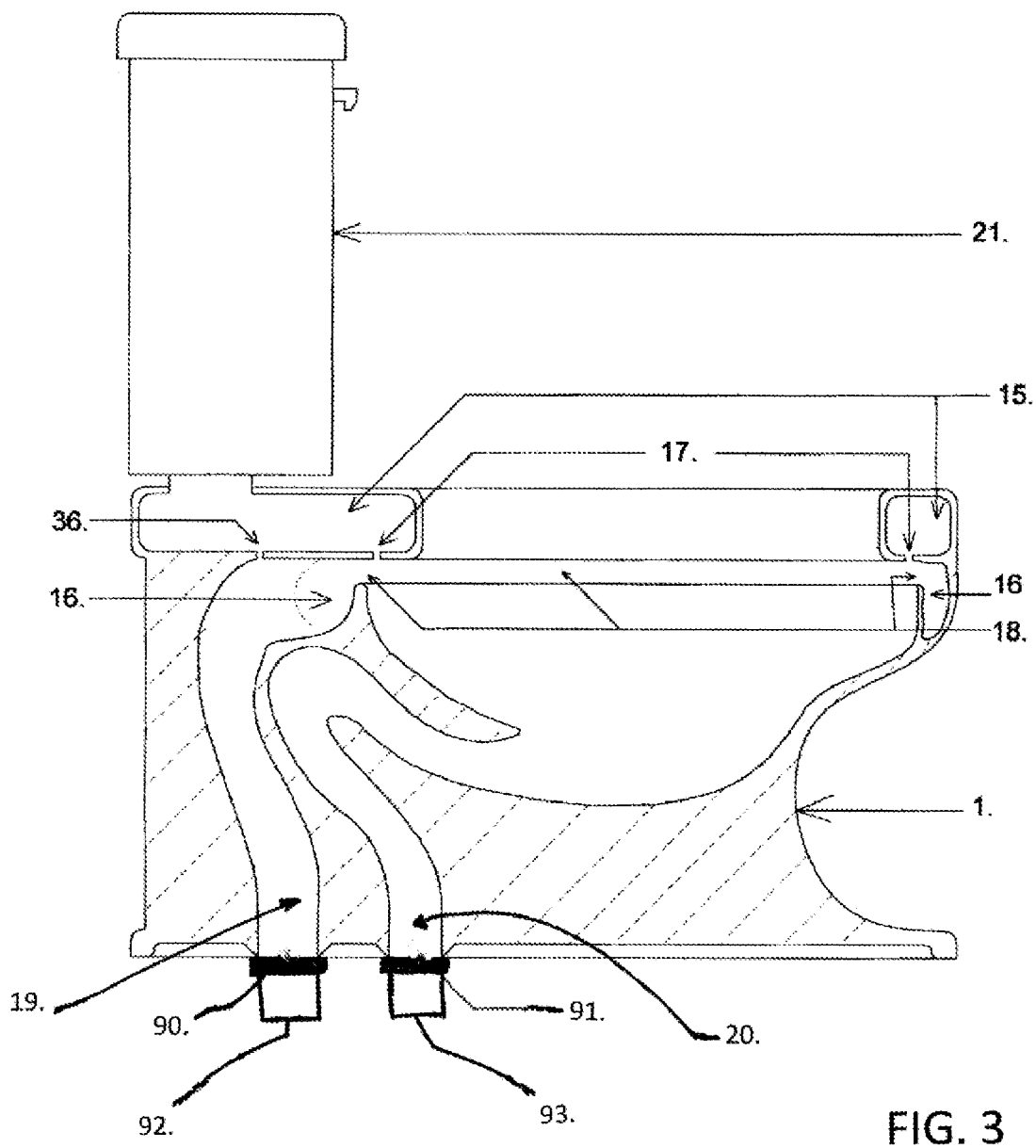
FIG. 3 is a cut away view of the floor mounted style toilet 1.

FIG. 3 is a cut away view of the floor mounted toilet 1 The tank 21 shown or flushing valve, not shown, is the supply source of water 31 when flushed. When flushed, water exits the tank 21 and enters the first chamber 15, then flows through a plurality of holes 17 into the bowl of the toilet 1. The force of the incoming water washes the waste out through the first exit port 20. Odor and overflows exit through a plurality of holes not shown or a continuous vent 18, shown. In at least one embodiment, a first seal 91 is provided to seal the first exit port 20 to a first connecting flange 93, and a second seal 90 is provided to seal the second exit port 19 to a second connecting flange 92.

Figure 4:
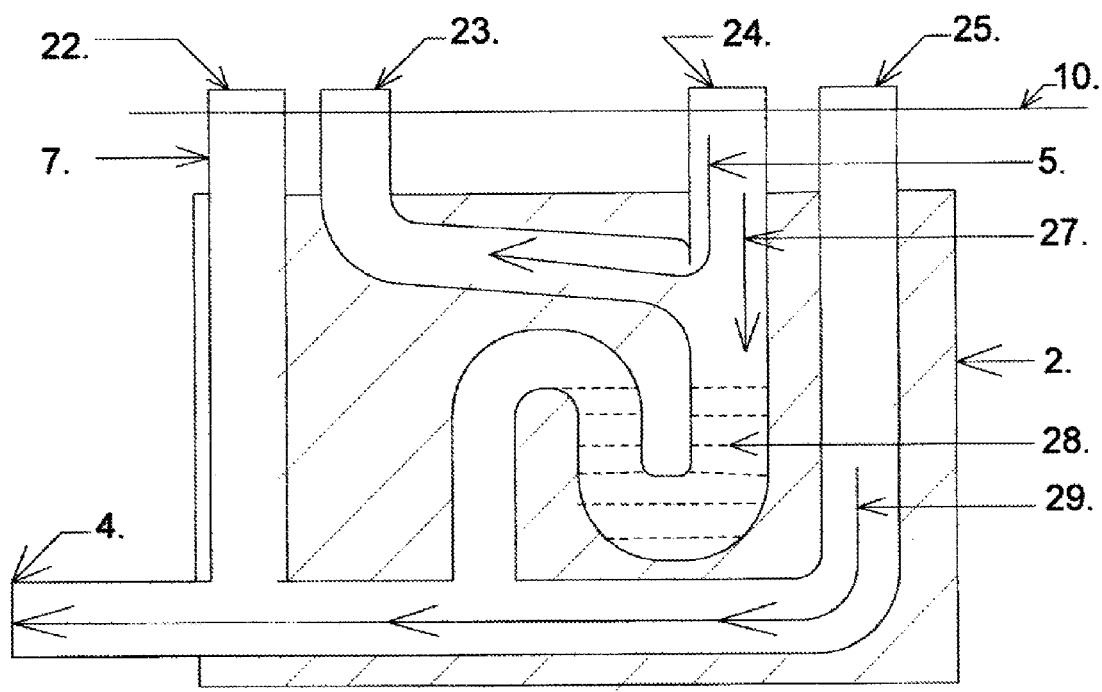
FIG. 4 is a schematic cut away view of the unique trap assembly 2 U.T.A.

FIG. 4 is a schematic cut away view of the unique trap assembly U.T.A. 2. The five connection ports are as such; sewage from the toilet 1 enters the U.T.A. 2 through port connection 25 and exits through port connection 4 to sewage waste. Odor 5 and overflows 27 from toilet 1 enters the U.T.A's 2 port connection 24. Odor 5 is exhausted through the U.T.A.'s 2 exit port connection 22 by way of inline exhaust fan 3. The trap 28 within the U.T.A. prevents sewage gasses from escaping the U.T.A. 2.

Figure 5:
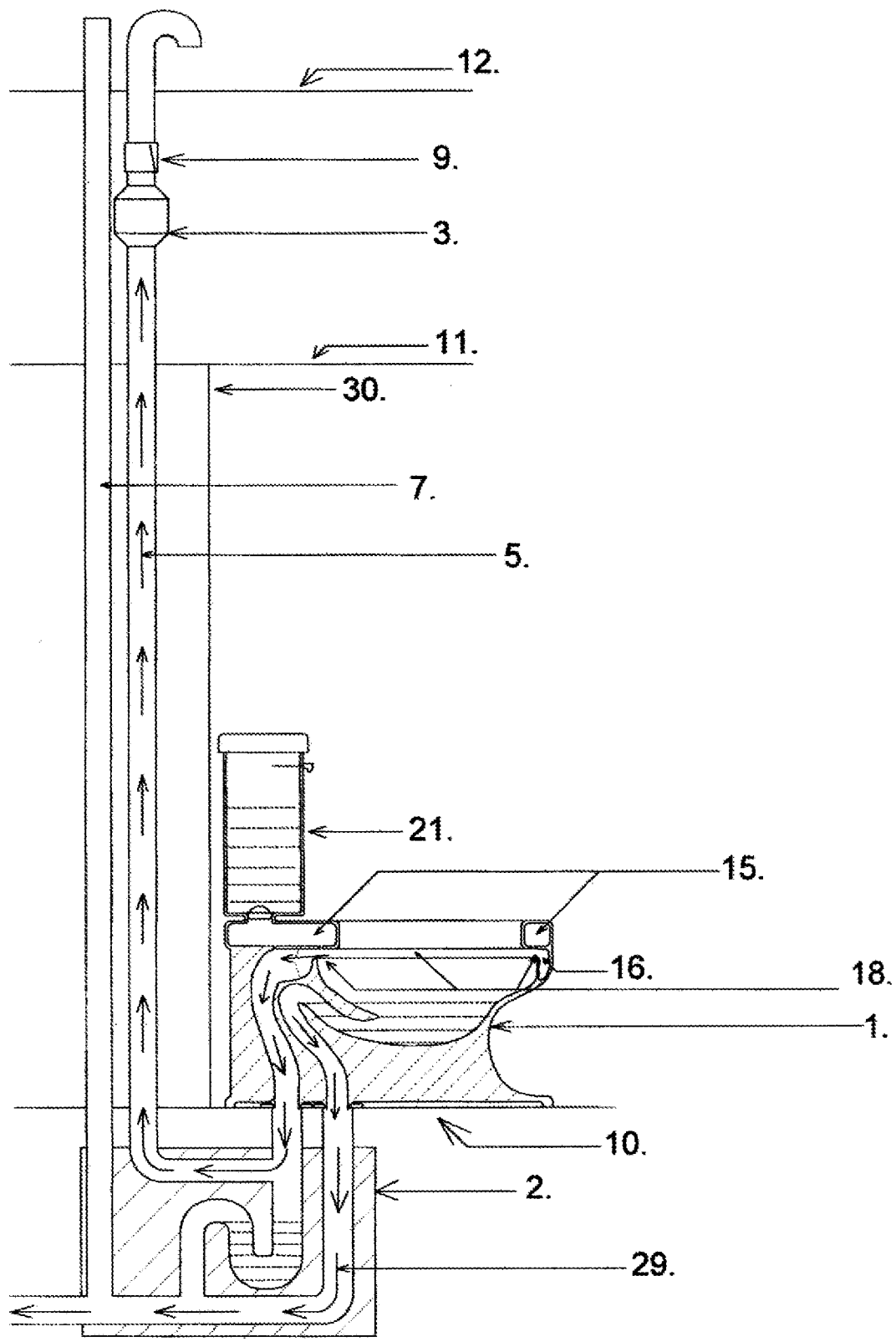
FIG. 5 is a schematic cut away view of the normal operations of the odorless and overflow-less toilet 1 system. Sewage 29 out through U.T.A.2 and odor 5 out though the inline exhaust fan 3.

FIG. 5 shows a schematic cut away view of system in normal operation. When toilet 1 is flushed, waste 29 exits through U.T.A. 2 and out to waste. When inline fan 3 is energized, odor 5 is removed from toilet 1 and removed to outside atmosphere.

Figure 6:
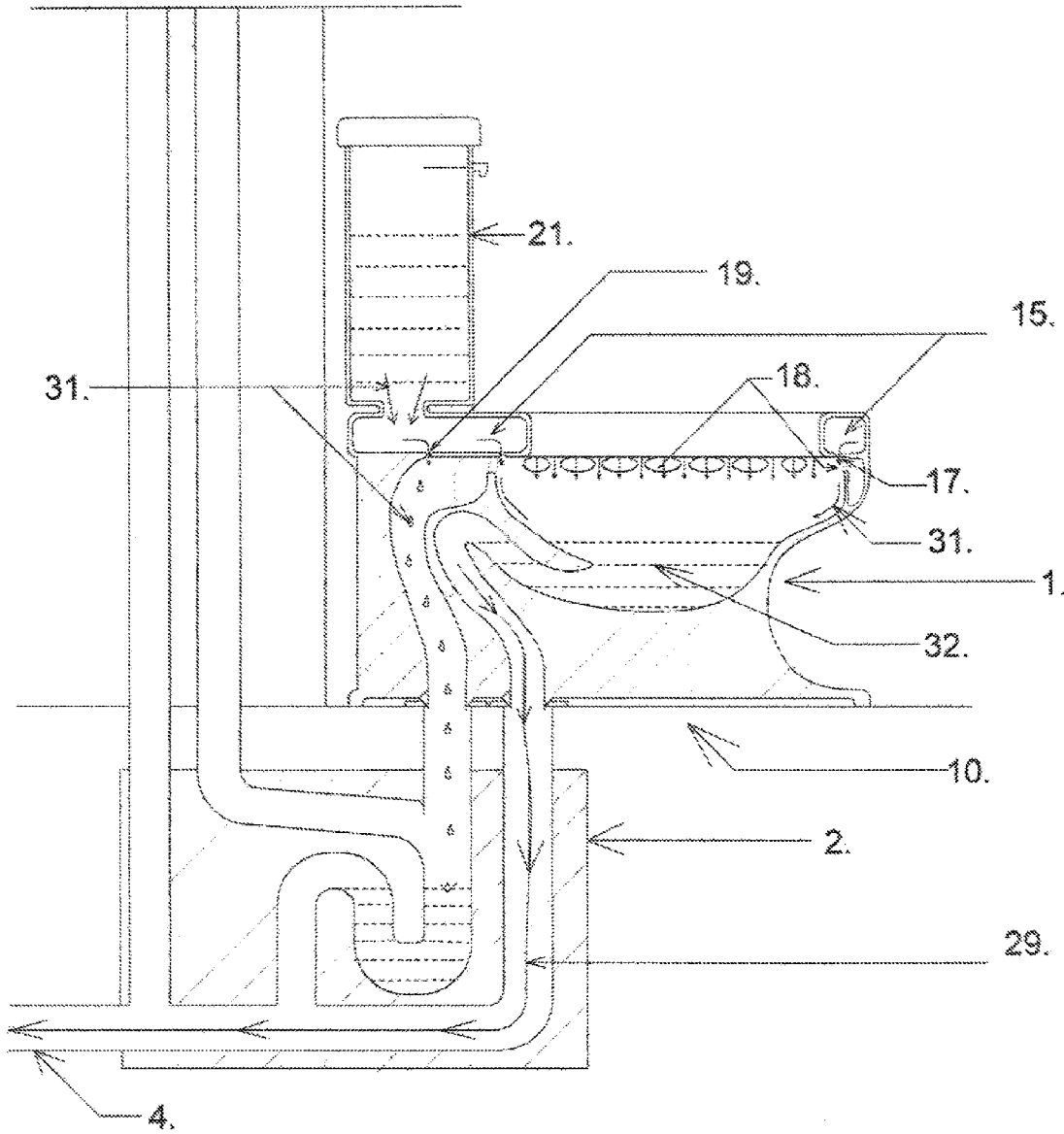
FIG. 6 is a close up schematic cut away view of flushing operation.

FIG. 6 shows a schematic cut away view of flushing operations. When toilet 1 is flushed, water 31 leaves the tank 21 travels through first chamber 15, then exits through a plurality of holes 17, enters the bowl 32 thus forcing the sewage 29 to exit through the U.T.A. 2 exit port 4.

Figure 7:
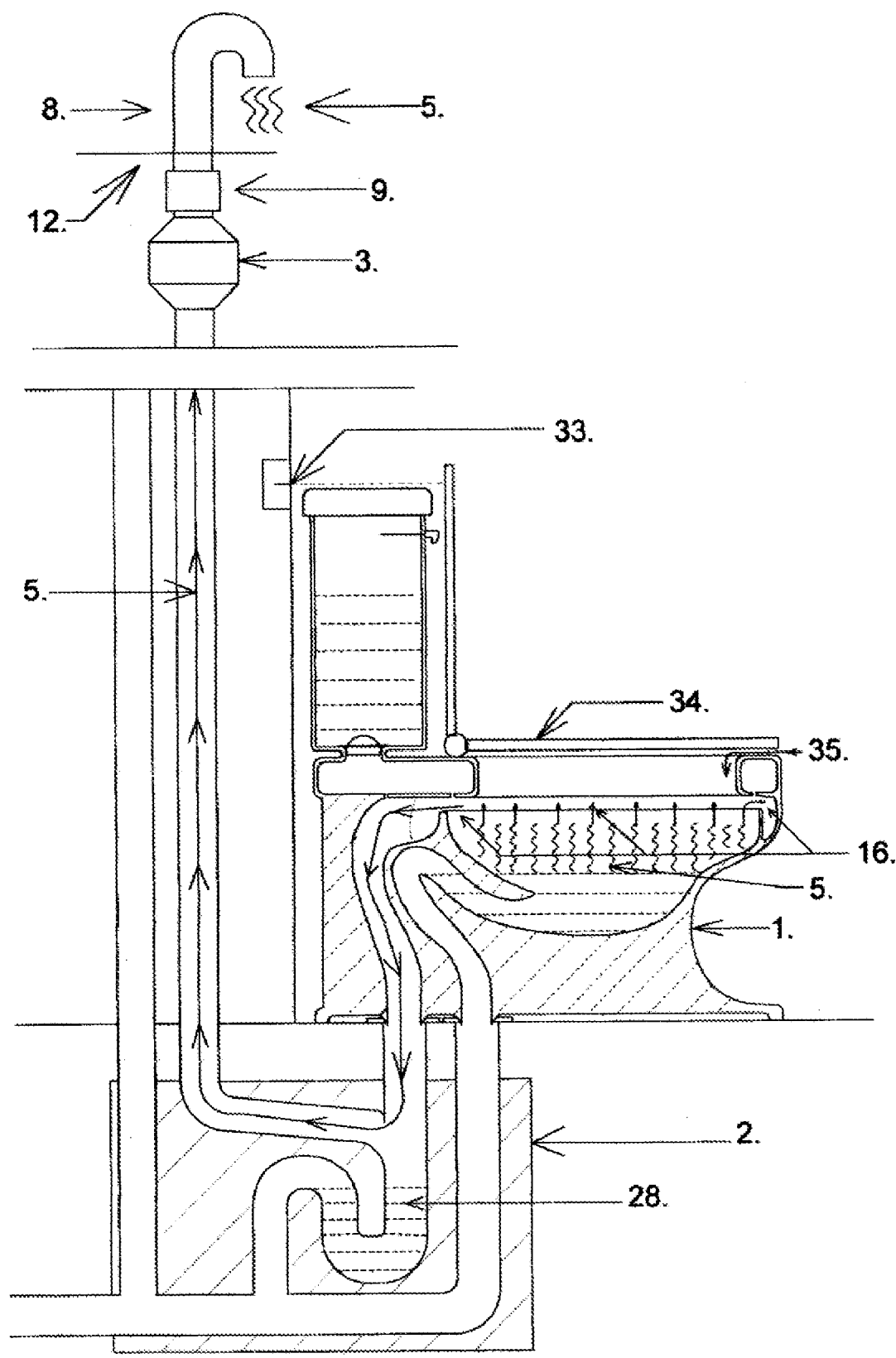
FIG. 7 is a close up schematic cut away view of odor removal operations.

FIG. 7 shows a schematic cut away view of odor 5 removal operations. When inline fan 3 is energized, the odor 5 exits the toilets 1 through the second chamber 16 and vents 18, then odor 5 travels out the second toilet 1 exit port 19, then through the U.T.A. 2, then through the inline fan 3 to the outside atmosphere.

Figure 8:
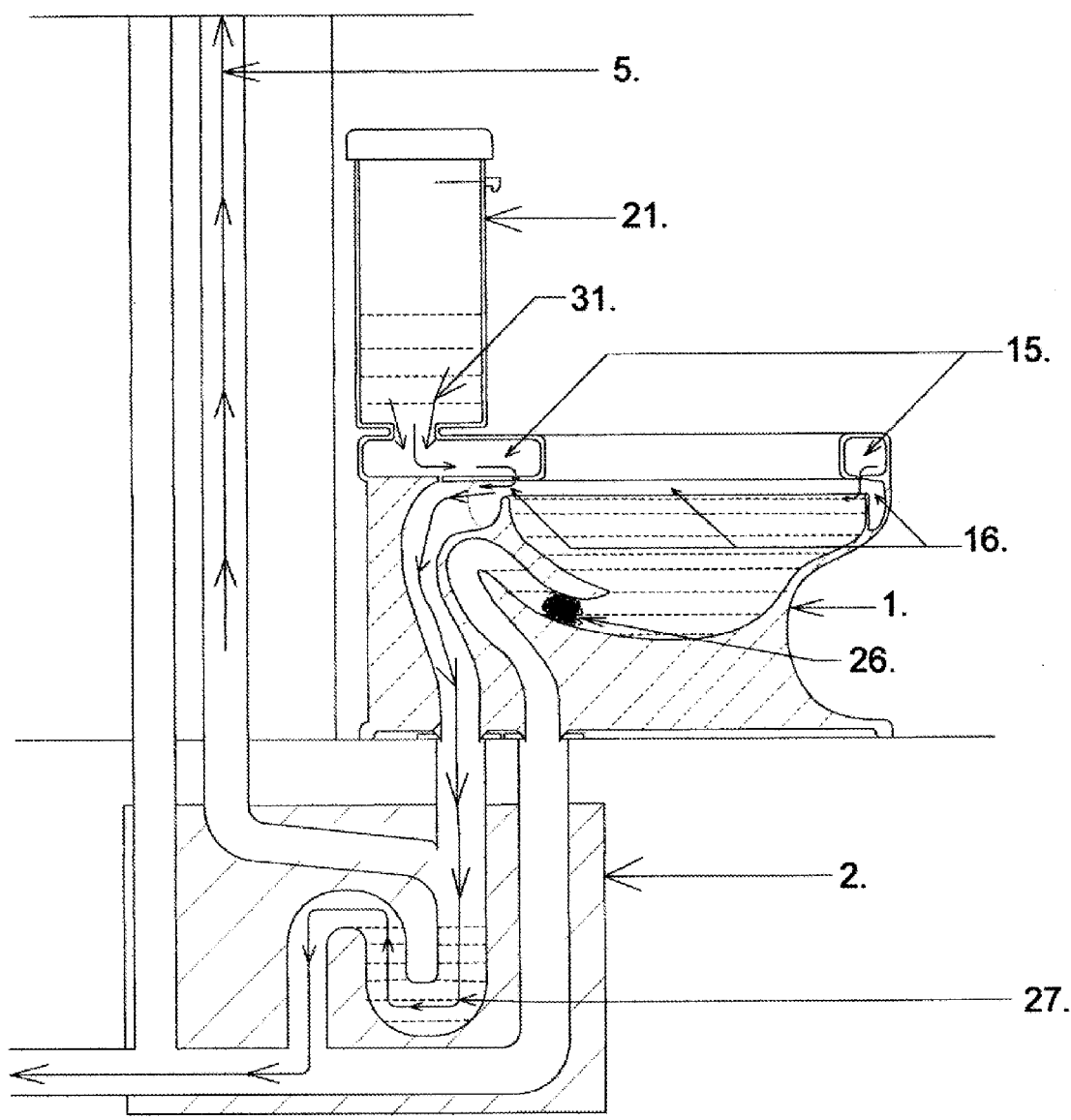
FIG. 8 is a close up schematic cut away view of overflow operations.

FIG. 8 shows a schematic cut away view of overflow 27 operations. When toilet 1 becomes clogged 26 the overflow 27 flows through the second chamber 16 and vents 18, then overflow 27 out the second toilet 1 exit port 19, then through the U.T.A. 2 and out to waste.

What is claimed is:

1. An odorless and overflow-less toilet system comprising:
a first chamber, the first chamber having a plurality of exit holes for water flow into a bowl of a toilet, the bowl having a first exit port and configured to distribute water during normal flushing operations;
a second chamber, the second chamber having a second plurality of holes or a continuous vent and configured for exit of overflows and odors and running in fluid communication with the first chamber and having a second exit port doubly configured to evacuate odor during normal operation and to distribute water in an overflow event; and
wherein the dual chamber, dual exit-port toilet system provides odor removal and overflow protection through the second plurality of holes or the continuous vent;
wherein the first and second exit ports are disposed underside on a base of a floor-mounted toilet and are not fluidly coupled one to another within the toilet for exit flows such that a clog in the first exit port utilized for normal flushing operations does not block the operation of the second exit port in an overflow event; and
wherein the first exit port continues into a trap assembly to a drain, and the second exit port continues into the trap assembly where it is branched into two, a first branch extending to an exhaust fan and to the atmosphere, and a second branch extending to a trap and joining the first exit port, the trap configured to hold water which is maintained by a small hole disposed between the first chamber and the second chamber to allow a small amount of water to pass each time the toilet is flushed, thereby preventing sewage gases from passing back through the trap assembly.

2. The odorless and overflow-less toilet system of claim 1, wherein the second chamber runs fluidly parallel to the first chamber; and wherein the second chamber is inconspicuous and does not impede the operation of the first chamber.

3. The odorless and overflow-less toilet system of claim 1, wherein the second exit port of the second chamber runs fluidly, generally parallel to the first exit port of the first chamber.

4. The odorless and overflow-less toilet system of claim 1, further comprising:
a first seal to seal the first exit port to a first connecting flange; and
a second seal to seal the second exit port to a second connecting flange.

5. The odorless and overflow-less toilet system of claim 4, wherein the second connecting flange provides additional anchors to better stabilize the toilet system.

6. The odorless and overflow-less toilet system of claim 1, wherein the second chamber and the second exit port are cast into the toilet system and remain inconspicuous.

7. The odorless and overflow-less toilet system of claim 1, wherein the second chamber and the second exit port provide a route for odor and overflow travel in the toilet system.

8. The odorless and overflow-less toilet system of claim 1, wherein the toilet system is configured for use in one of the group consisting of residential, commercial, and industrial systems; and wherein the toilet system is manufactured from one of the group consisting of vitreous china, porcelain, plastic, and stainless steel.

9. The odorless and overflow-less toilet system of claim 1, wherein the trap assembly is configured to function with one from the group consisting of a floor mounted system and a wall mounted system.

10. The odorless and overflow-less toilet system of claim 1, wherein the trap assembly is configured to prevent sewage gases from escaping back through the toilet system.

11. The odorless and overflow-less toilet system of claim 1, wherein the trap assembly is configured to allow passage of odors from the toilet to an inline exhaust fan, thereby preventing the risk of being blocked in the event of an overflow.

12. The odorless and overflow-less toilet system of claim 1, wherein the trap assembly is configured to allow the passage of overflows to be routed back to a sewage out line.

13. The odorless and overflow-less toilet system of claim 1, wherein the trap assembly further comprises:
a sewage-in-from-toilet port;
an odor-and-overflow-in-from-toilet port;
an odor-out-to-inline-exhaust-fan port;
a sewage-waste-vent-line-to-outside atmosphere port; and
a sewage-and-overflow-out-to-waste port.

14. The odorless and overflow-less toilet system of claim 1, further comprising:
an inline exhaust fan to remove odors from the toilet.

15. The odorless and overflow-less toilet system of claim 14, wherein the inline exhaust fan is energized by one of the group consisting of configured to run continuously, wired to be switched independently, wired to be switched with a light, wired to be used with a close proximity switch in the wall, and wired to be used with a close proximity switch with a flush valve.

16. The odorless and overflow-less toilet system of claim 14, wherein the inline exhaust fan provides ventilation to more than one toilet system.

17. The odorless and overflow-less toilet system of claim 1, wherein components of the toilet system are connected materials from at least one of the group consisting of PVC and cast iron pipe.

* * * * *